US007113402B2

(12) United States Patent
Rutledge et al.

(10) Patent No.: US 7,113,402 B2
(45) Date of Patent: Sep. 26, 2006

(54) SYSTEMS, APPARATUS AND METHOD FOR REDUCING DUST ON COMPONENTS IN A COMPUTER SYSTEM

(75) Inventors: James Stephen Rutledge, Durham, NC (US); Cory Allen Chapman, Raleigh, NC (US); Kenneth Scott Seethaler, Raleigh, NC (US); William Stephen Duncan, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 176 days.

(21) Appl. No.: 10/956,166

(22) Filed: Oct. 1, 2004

(65) Prior Publication Data

US 2006/0072289 A1    Apr. 6, 2006

(51) Int. Cl.
*H05K 7/20* (2006.01)

(52) U.S. Cl. .................. 361/695; 361/687; 361/690; 174/16.1; 174/16.3; 165/80.3; 454/184

(58) Field of Classification Search .............. 361/695; 174/16.1; 454/184
See application file for complete search history.

(56) References Cited

U.S. PATENT DOCUMENTS 5,249,741 A    10/1993   Bistline et al.
5,942,017 A     8/1999   Van Winkle
5,980,614 A  * 11/1999   Loreth et al. .................. 96/63
6,126,722 A  * 10/2000   Mitchell et al. ................ 95/57
6,522,536 B1    2/2003   Brewer et al.
6,635,106 B1   10/2003   Katou et al.
2004/0007000 A1  1/2004   Takeda et al.
2004/0150959 A1* 8/2004   Sullivan ...................... 361/728
2005/0286224 A1* 12/2005   Chao .......................... 361/695

FOREIGN PATENT DOCUMENTS

WO      WO 01/69357 A1    9/2001

* cited by examiner

*Primary Examiner*—Boris Chervinsky
(74) *Attorney, Agent, or Firm*—Scott W. Reid; Schubert Osterrieder & Nickelson PLLC (57) ABSTRACT

An apparatus and method for reducing dust on components in a computer system is disclosed. Embodiments include a system that generally includes an enclosure, a component mounted with the enclosure, and a fan adapted to induce an airflow towards the component to provide cooling. The system also generally includes a dust ionizer adapted to provide an electrical charge to dust particles within the airflow and a dust reflector having an electrical charge adapted to deflect the charge dust particles away from the component. In some embodiments, the component may be a processor, heat sink, video chip, memory module, voltage regulator module, etc.

29 Claims, 6 Drawing Sheets

SYSTEMS, APPARATUS AND METHOD FOR REDUCING DUST ON COMPONENTS IN A COMPUTER SYSTEM

FIELD OF INVENTION

The present invention is in the field of computer systems. More particularly, the present invention relates to a method and apparatus for reducing dust on components in a computer system.

BACKGROUND

Personal computer (PC) systems are well known in the art. They have attained widespread use in many segments of today's modern society as a result of their widespread use for telecommuting, news, stock market information and trading, banking, shopping, shipping, communication in the form of hypertext transfer protocol (http) and email, as well as other services. PCs are typically provided with enclosures which protect the operating components of the computer, provide an aesthetically pleasing appearance, and shield against undesirable emission of electromagnetic energy.

Many components of PCs generate heat during operation, making it necessary to cool those components so that proper functioning continues, particularly because of the confined space of the enclosure which makes it more difficult to reject waste heat. Cooling strategies for PCs usually rely upon forced air flow through the computer enclosure. A typical arrangement provides a single fan, typically mounted in or adjacent the power supply for the computer, which induces a flow of air through the enclosure and particularly through the power supply, which is often the principal heat source within the enclosure. While the forced air provides an effective method for cooling PCs, it also brings dust or other particles into the enclosure. Dust may then gather on critical components, eventually resulting in failure of that component and potentially the entire PC. The problem of accumulated dust is exacerbated for thermally-sensitive components, as dust accumulations contribute to overheating and eventual failure. Accumulation of dust may result in a safety hazard as well. Dust on a heat generating component typically heats up with that component, which may result in a fire. A fire may also be created when accumulated dust creates a short between two electrical components.

One method of remedying the dust situation is to periodically open up the system to either blow out the dust using compressed air or to collect the dust with a vacuum cleaner. Manually blowing out or removing the dust with a vacuum clean are time-consuming for the user, making them undesirable. Moreover, these methods rely on activity that may not be performed, particularly if users are asked to do the work themselves, and therefore do not prevent the accumulation of dust in many cases. These methods also require for the computer to be turned off in order to open the system up for dust blowing or removal, resulting in downtime for the system. Because of their cost, complication, and ineffectiveness, these methods do not provide a satisfactory solution for many users.

Some systems implement a filter at the air inlet of the enclosure, attempting to reduce the amount of dust that enters the system. Filtration systems do remove some of the dust that would otherwise enter the system. Filtration systems, however, are somewhat inefficient, particularly for small particles, resulting in significant amounts of dust still entering. Another problem with filtration systems is that they can drastically reduce the amount of air entering the system, making cooling more difficult. More effective filters with smaller gaps decrease the amount of air that goes through at a given power setting, requiring either reduced airflow or increased fan size or power. Neither solution is desirable as they increase costs and run the risk of creating more noise.

There is, therefore, a need for an effective and efficient system and method to reduce the amount of dust on certain components of computer systems. There is an even greater need for such a system when components are thermally-sensitive.

SUMMARY OF THE INVENTION

The problems identified above are in large part addressed by an apparatus and method for reducing the dust on a component of a computer system. One embodiment generally provides an enclosure adapted to enclose components of the computer system, a component with at least one surface mounted with the enclosure, and fan mounted within the enclosure, where the fan is adapted to induce an airflow into the enclosure through an air intake and towards the component. The embodiment also generally includes a dust ionizer mounted within the enclosure that is adapted to provide an electrical charge to dust particles within the airflow before the airflow reaches the component. The embodiment further includes a dust reflector having an electrical charge mounted in proximity to the component that is adapted to deflect the charged dust particles away from the at least one surface of the component. The component may be a processor, heat sink, video chip, memory module, voltage regulator, or any other component. Further embodiments provide for the dust ionizer and dust reflection carrying a high voltage, low current negative charge.

Another embodiment provides a method for reducing the dust on a component of a computer system. The method generally includes directing air into an enclosure of the computer system, the air having dust particles within it, and providing an electrical charge to dust particles in the air. The method generally further includes directing the air towards a component to provide cooling to the component and deflecting the charged particles away from the component. A further embodiment additionally further provides that providing an electrical charge to dust particles includes directing air through a dust ionizer.

A further embodiment provides an apparatus for reducing the dust on a component of a computer system. One embodiment may generally provide an enclosure adapted to enclose components of the computer system and a heat generating component with at least one surface mounted with the enclosure. The apparatus may also generally include airflow inducing means for inducing airflow towards the heat generating component. The apparatus may also generally include dust charging means for providing an electrical charge to dust particles within the airflow before the airflow reaches the heat generating component. The apparatus may also generally include dust reflecting means for deflecting the charged dust particles away from the at least one surface of the heat generating component. The component may be a processor, heat sink, video chip, memory module, voltage regulator, or any other component.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

An apparatus and method for reducing dust on components in a computer system is disclosed. Embodiments include a system that generally includes an enclosure, a component mounted with the enclosure, and a fan adapted to induce an airflow towards the component to provide cooling. The system also generally includes a dust ionizer adapted to provide an electrical charge to dust particles within the airflow and a dust reflector having an electrical charge adapted to deflect the charge dust particles away from the component. In some embodiments, the component may be a processor, heat sink, video chip, memory module, voltage regulator module, etc.

The disclosed embodiments provide an effective and efficient system for reducing the accumulation of dust on particular components of a computer system. In one embodiment, the dust particles in air being used to cool a component are provided with an electrical charge as the air is passed through a dust ionizer. The heat generating component has an associated dust reflector in this embodiment where the dust reflector is adapted to deflect the charge dust particles away from the component. This reduces or eliminates dust from reaching the component and accumulating, which increases the lifespan and reduces the risks associated with dust accumulation.

Various embodiments of the present invention provide systems for reducing the dust on a component of a computer system. The following description provides specific details of certain embodiments of the invention illustrated in the drawings to provide a thorough understanding of those embodiments. It should be recognized, however, that the present invention can be reflected in additional embodiments and may be practiced without some of the details in the following description. In other instances, well-known structures and functions have not been shown or described in detail to avoid unnecessarily obscuring the description of the embodiments of the invention. While specific embodiments will be described below with reference to particular configurations and systems, those of skill in the art will realize that embodiments of the present invention may advantageously be implemented with other substantially equivalent configurations and/or systems.

Figure 1:
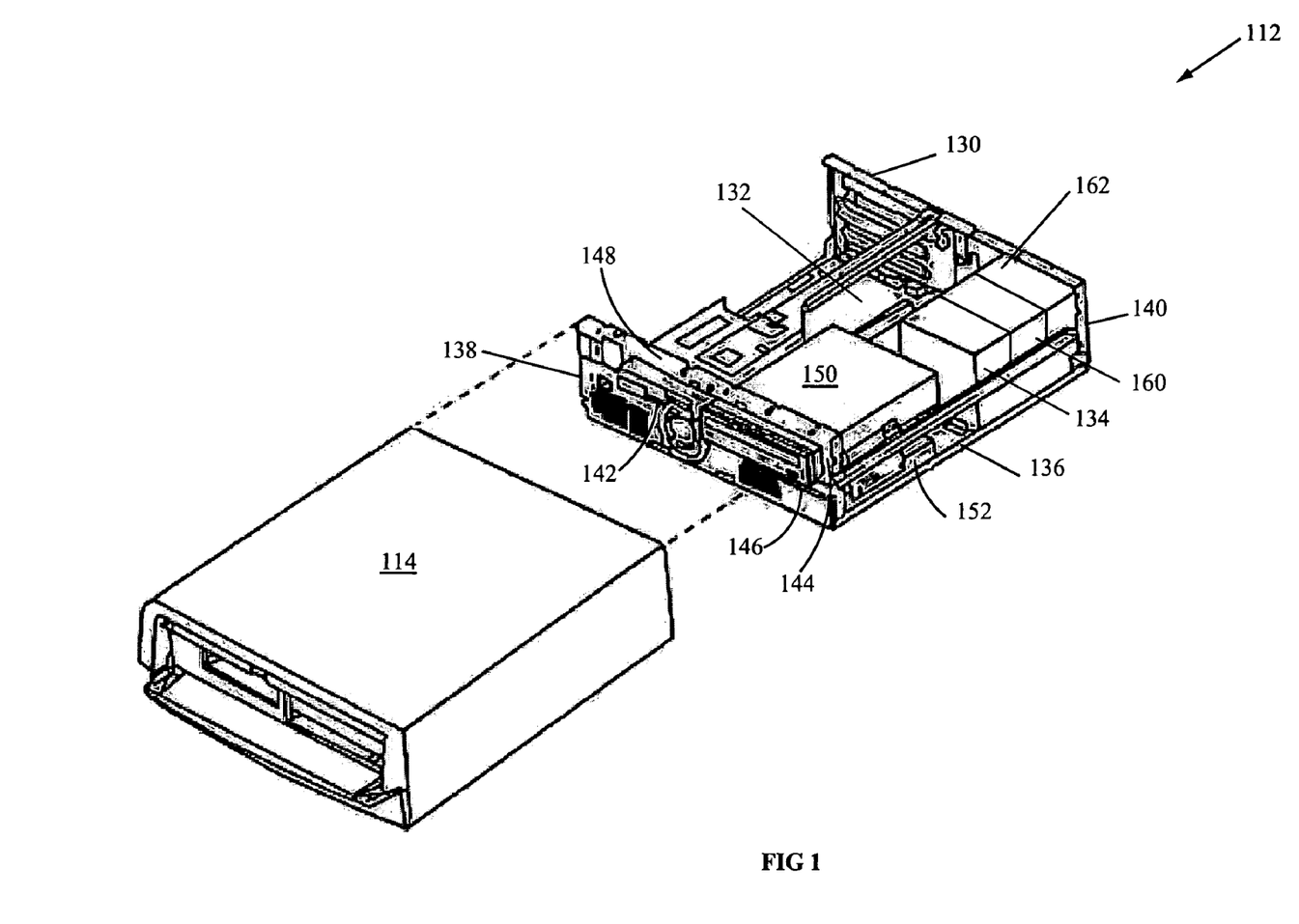
FIG. 1 depicts an exploded perspective view of certain elements of a processing device, including a chassis, a cover, a planar board, and dust ionizer according to one embodiment.
Figure 2:
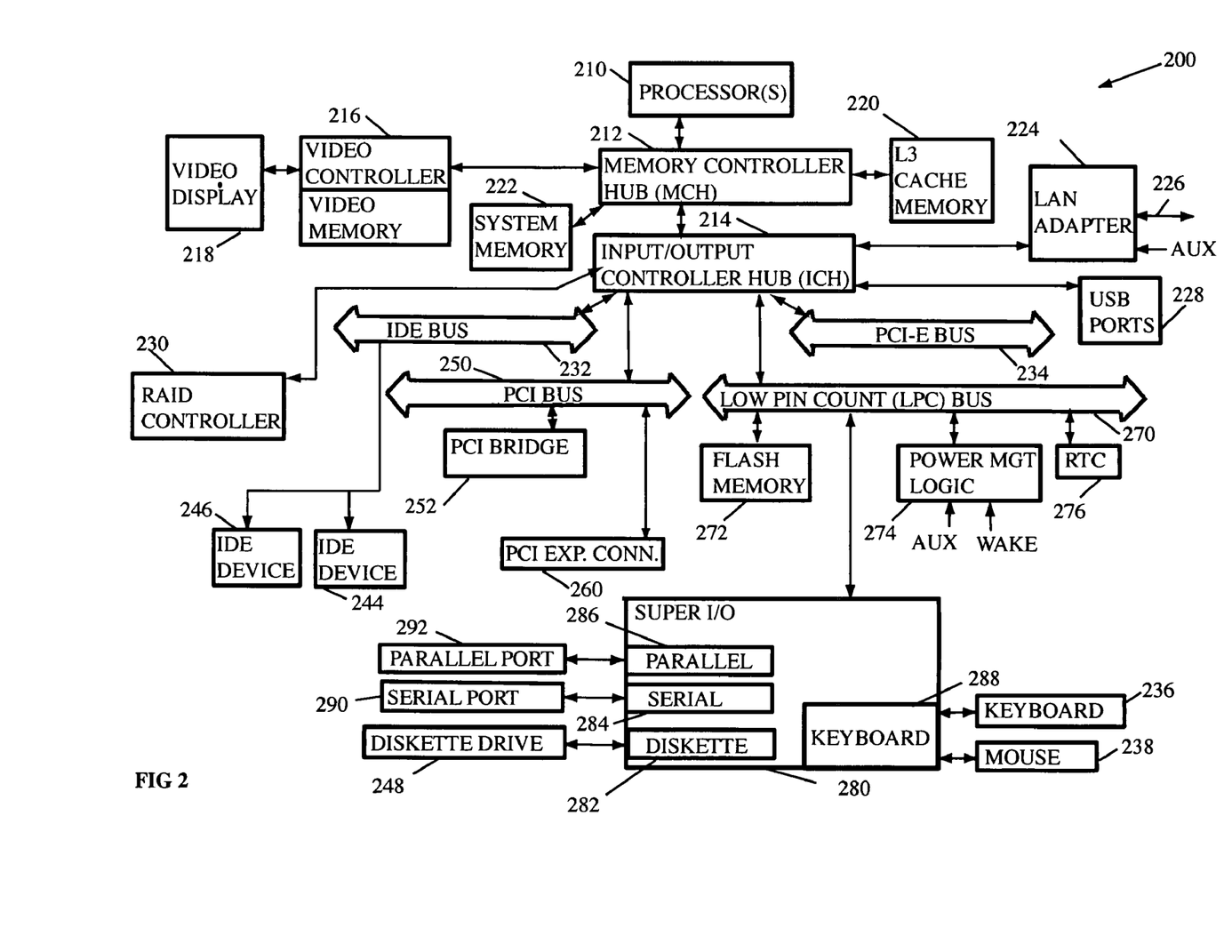
FIG. 2 depicts a block diagram of certain components of the processing device of FIG. 1 according to one embodiment.

Turning now to the drawings, FIGS. 1 and 2 depict a personal computer 112 according to one embodiment. Other possibilities for the personal computer 112 are possible, including a computer having capabilities other than those ascribed herein to a "personal computer", and possibly beyond those capabilities, and they may, in other embodiments, be any combination of processing devices such as workstations, servers, mainframe computers, notebook or laptop computers, desktop computers, personal digital assistants (PDAs), wireless devices, mobile phones, or the like.

FIG. 1 depicts an exploded perspective view of certain elements of a processing device, including a chassis, a cover, a planar board, and dust ionizer according to one embodiment. Cover 114 may be a decorative outer member that cooperates with a chassis 130 in defining an enclosed, shielded interior volume (i.e., the enclosure) for receiving electrically powered data processing and storage components to process and store digital data. At least certain of these components may be mounted on a multi-layer planar 132 or motherboard which may be mounted on the chassis 130 and may provide a means for electrically interconnecting the components of the personal computer 112, including those identified above and such other associated elements as floppy disk drives, various forms of direct access storage devices, accessory adapter cards or boards, and the like.

Personal computer 112 may have a power supply 134 that may be actuated by a power switch (not shown). The chassis 130 may have a base indicated at 136, a front panel indicated at 138, and a rear panel indicated at 140. The front panel 138 may define at least one open bay for receiving a data storage device such as a disk drive for magnetic or optical disks, a tape backup drive, or the like. A dust ionizer 160 may be located near power supply 134 and positioned so that air coming through the air inlet (not shown) flows through the dust ionizer 160. An optional fan housing 162 may be located adjacent the air inlet and includes a fan (not shown) or other device used to propel air that is used to draw air into the enclosure (i.e., the chassis 130 and cover 114 and the volume formed by them) through an air inlet (not shown), and then through the dust ionizer 160 and/or power supply 134. As power supplies 134 are typically the most significant heat source in a personal computer 112, cooling outside air is often drawn directly through the power supply 134 to maximize cooling. The fan or other device may be located in the fan housing 162, dust ionizer 160, power supply 134, or otherwise.

Figure 3:
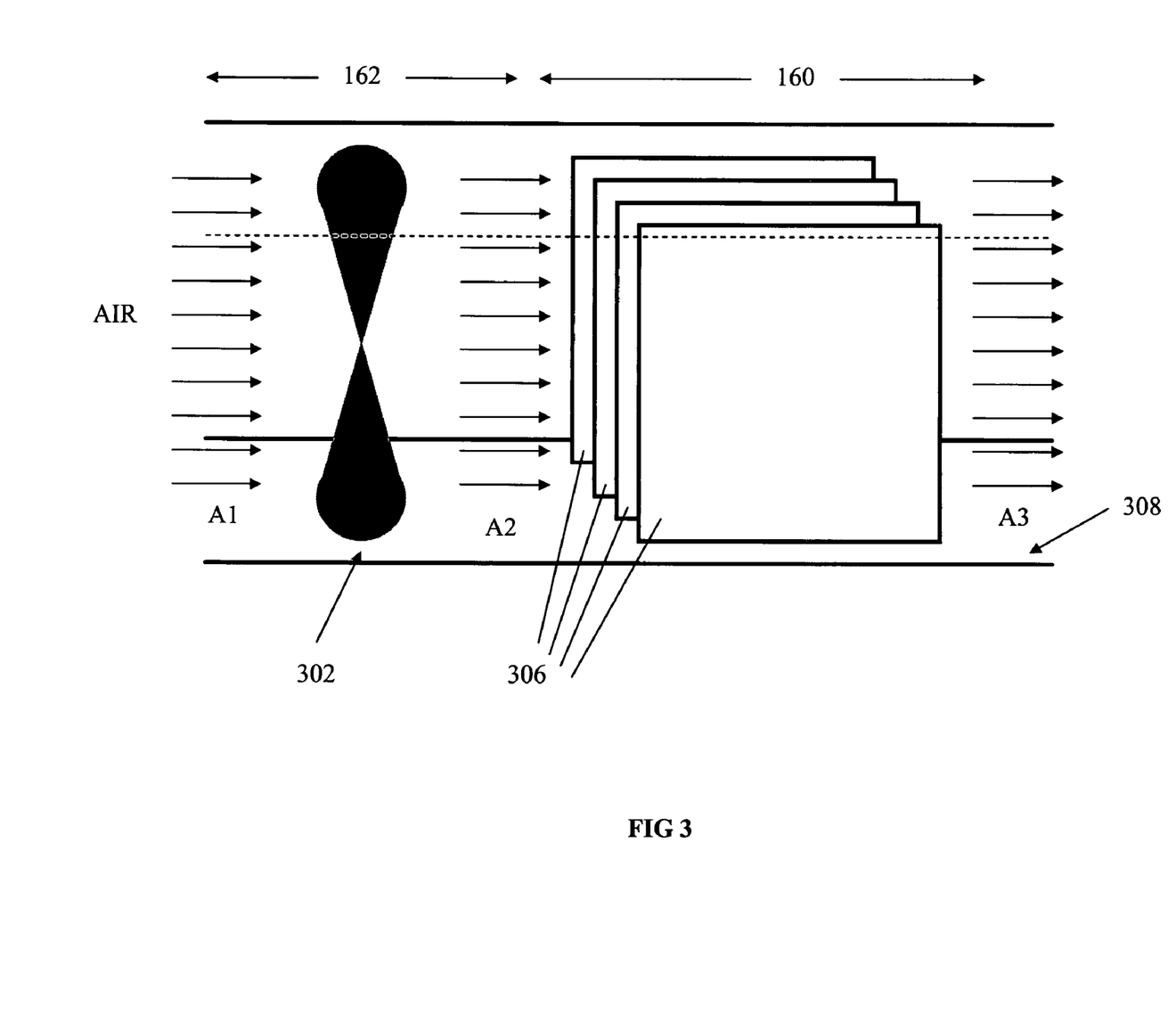
FIG. 3 depicts a schematic isometric view of a fan, fan housing, and dust ionizer according to one embodiment.
Figure 4:
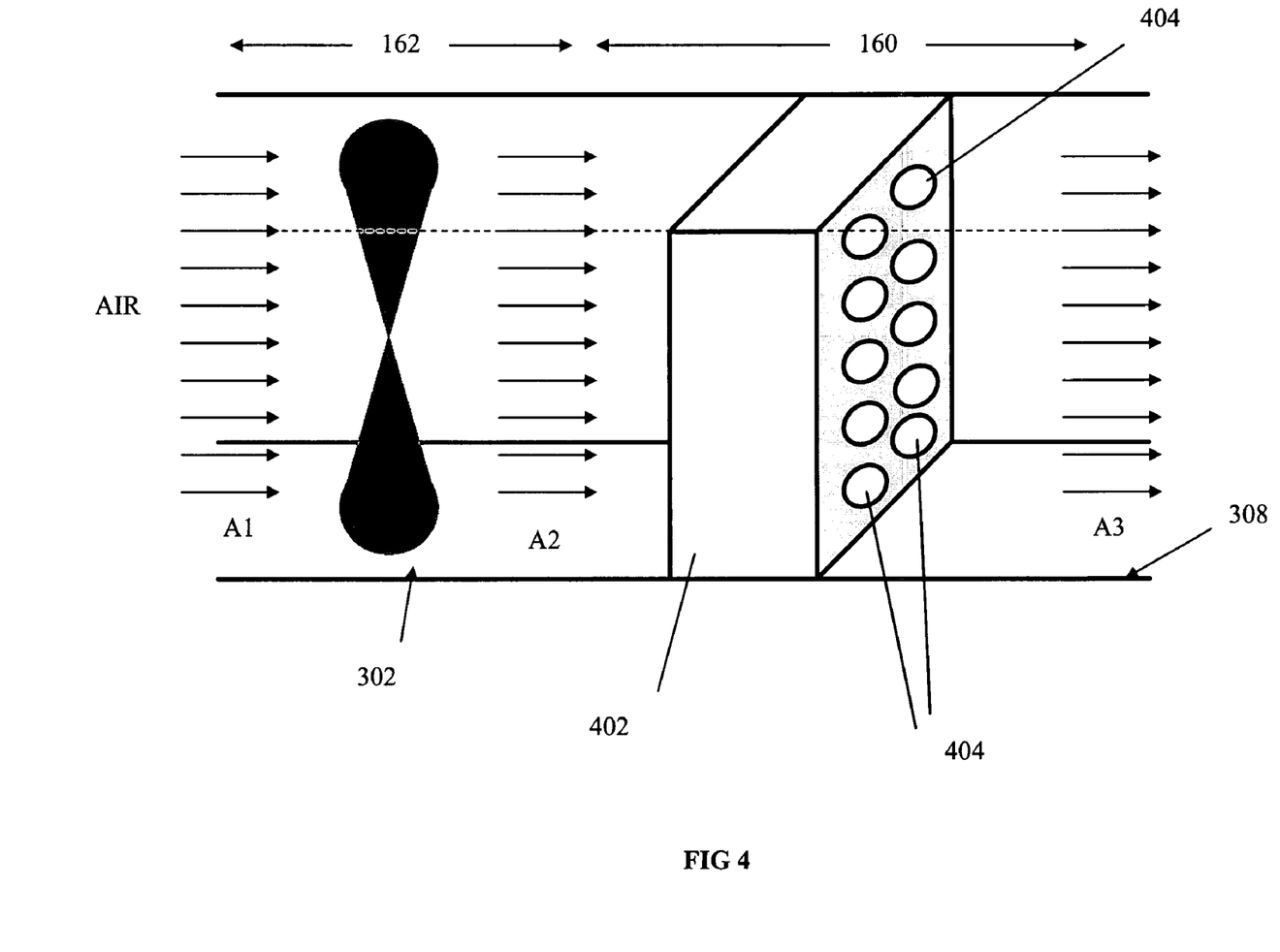
FIG. 4 depicts a schematic isometric view of a fan, fan housing, and dust ionizer according to an alternative embodiment.

The dust ionizer 160 may include a housing and one or more charged objects (such as conductive plates) and is described in more detail in relation to FIGS. 3 and 4. Air with dust or other particles (hereinafter "dust") that enters the dust ionizer 160 passes over or by the charged objects, resulting in a charge being placed on some or all of the dust or other particles. In the depicted embodiment, the dust ionizer 160 is located upstream of the power supply 134, but it may also be downstream of the power supply 134 or independent of the power supply 134. The power supply 134, dust ionizer 160, and fan housing 162 may be located in-line in any order or may be located in any location, including in separate locations. In one embodiment, the dust ionizer 160 may be located downstream of the fan housing 162, as the high voltage of the dust ionizer 160 may be safer to users if it is located behind the fan housing 162 (with its protective elements). In some embodiments, the dust ionizer 160 may be located close to the air inlet so that dust is ionized as quickly as possible and before it distributes throughout the enclosure. This helps ensure that dust is ionized before it reaches any components for which a dust reflector (described in more detail in relation to FIG. 2 and FIG. 5) is used.

The dust reflectors, in one embodiment, carry the same charge as the charge imparted to the dust so that they repel the charged dust particles, preventing them from contacting the component associated with the dust reflector. Dust that is repelled then moves towards other components, particularly unprotected components, or out of the enclosure entirely. The combination of the dust ionizer 160 and dust reflector thus reduces or eliminates the accumulation of dust on components protected with a dust reflector, potentially increasing the lifespan of those components and the computer system 112 and improving safety.

In the illustrated form, a pair of upper bays 142, 144 and a lower bay 146 are provided. One of the upper bays 142 may be adapted to receive peripheral drives of a first size (such as those known as 3.5 inch drives) while the other 144 may be adapted to receive drives of a different size (such as a CD-ROM or DVD-ROM drive) while the lower bay may be adapted to receive another drive. One floppy disk drive indicated at 148 may be a removable medium direct access storage device (DASD) capable of receiving a diskette inserted there into and using the diskette to receive, store and deliver data as is generally known. One CD-ROM drive indicated at 150 is a removable medium DASD capable of receiving a compact disk inserted there into and using the disk to deliver data as is generally known. One hard disk drive is indicated at 152 and is a fixed medium DASD capable of storing and delivering data as is generally known. Items in the bays 142, 144, 146, such as the hard disk drive 152, CD-ROM drive 150 or floppy disk drive 148 may be protected with a dust reflector in one embodiment.

Referring now to FIG. 2, there is shown a block diagram 200 of certain components of the processing device of FIG. 1 according to one embodiment. The components of FIG. 2 comprise components mounted on the planar 132 or other hardware of the personal computer 112. Connected to the planar 132 is the system CPUs or processor(s) 210, which may be connected directly to a memory controller hub (MCH) 212. As one example, the system processor(s) 210 could be an Intel Pentium processor, Cyrix 586-P75 processor or Advanced Micro Devices 8486 processor or any other suitable processor.

MCH 212 and input-output (I/O) controller hub (ICH) 214 represent part of the personal computer's 112 core logic chipset, facilitating access to/from processor(s) 210 from/to memory devices and I/O devices, respectively. More specifically, MCH 212 may provide access to system memory 222 and level three (L3) cache memory 220. In many such embodiments, level one (L1) and level two (L2) cache are incorporated into each processor of processor(s) 210. MCH 212 may also include a special bus adapted for direct memory access (DMA) by a video controller. In some embodiments, the special bus may be an accelerated graphics port (AGP). The AGP may be a high-speed port that is designed for the display adapter 216, a video card typically including a video controller and video memory. The AGP may provide a direct connection between the card 216 and system memory 222. In other embodiments, a peripheral component interconnect (PCI) bus such as a PCI-E bus may be implemented for video display 218.

System memory 222 may include random access memory (RAM) such as double data rate (DDR) synchronous dynamic random access memory (SDRAM). System memory 222 may be composed of one or more memory modules and MCH 212 may include a memory controller with logic for mapping addresses to and from processor(s) 210 to particular areas of system memory 222 and a cache controller operatively coupled with L3 cache memory 220.

Input/Output Controller Hub (ICH) 214 may be designed to coordinate communications with various I/O devices. In the depicted embodiment, ICH 214 couples with local area network (LAN) adapter 224, universal serial bus (USB) ports 228, redundant array of independent disks (RAID) controller 230, integrated drive electronics (IDE) bus 232, PCI Express (PCI-E) bus 234, PCI bus 250, and low pin count (LPC) bus 270. LAN adapter 224 may be coupled to either the PCI bus 250 or directly to ICH 214 to facilitate communication (i.e., transmit/receive data) with a remote computer or server over a LAN via a connection or link 226. LAN adapter 224 may be a card to be plugged in personal computer 112 or a LAN connection embedded on the planar 132. LAN adapter 224 may also be known as a network interface card (NIC).

LAN adapter 224 may include a Media Access Controller (MAC), which serves as an interface between a shared data path (e.g., a media independent interface as described below) and the ICH 214. The MAC may perform a number of functions involved in the transmission and reception of data packets, including assembling the data to be transmitted into a packet with address and error detection fields and conversely, during the reception of a packet, disassembling the packet and performing address checking and error detection. The MAC may be, for example, an Intel 82557 chip. LAN adapter 224 may further include a physical layer and a media independent interface (MII), which is a local bus between the MAC and the physical layer. The MII is a specification of signals and protocols, which formalizes the interfacing of a 10/100/1000 Mbps Ethernet MAC, for example, to the underlying physical layer. The physical layer receives parallel data from the MII local bus and converts it to serial data for transmission over link 326. The physical layer may be, for example, an Integrated Circuits Systems 1890 chip.

Personal computer 112 may include one or more USB ports 228, which are hardware interfaces for peripherals such as the keyboard, mouse, joystick, scanner, printer, telephony devices, hard drives, compact disk (CD) drives, digital video disk (DVD) drives, and the like. Personal computer 112 may include a Redundant Arrays of Independent Disks (RAID) controller 230, which is a controller for a disk subsystem that is used to increase performance or provide fault tolerance. More specifically, RAID controller 230 may couple with a set of two or more ordinary hard disks and improves performance by disk striping, which interleaves bytes or groups of bytes across multiple drives, so more than one disk is reading and writing simultaneously.

IDE bus 232 and PCI-E bus 234 may be incorporated to facilitate connection of additional I/O devices with ICH 214. IDE bus 232 is a type of hardware interface widely used to connect hard disks, CD-ROMs and tape drives to a PC. IDE bus 232 may provide for the attachment for hard disk drive 344 and CD-ROM drive 346. PCI-E bus 234 is a high-speed peripheral interconnect designed to match the higher speeds of CPUs. PCI bus 250 may couple a PCI bridge 252 to facilitate the connection of additional PCI devices and a PCI expansion connector 260 to facilitate expansion of the PCI bus 250 so even more peripheral devices can communicate with ICH 214 via PCI bus compatible peripheral cards.

Attached to the LPC 270 may be a flash memory (FM) module or chip 272, power management logic 274, and a real-time clock (RTC) 276, and a multi-function or super I/O controller 280. Flash memory module 272 contains microcode that personal computer 112 will execute on power on. The flash memory 272 may be a non-volatile memory module or chip. Power management logic 274 allows for changing between various power states (e.g., off, suspend and normal operating states). The circuitry is supplied with auxiliary power (AUX), or standby power, from the power supply 134 (as shown in FIG. 1) when the personal computer 112 is in the off state so that it can monitor events that cause the personal computer 112 to turn on.

The real-time clock (RTC) 276 may be used for time of day calculations. Super I/O controller 280 may include functionality such as, for example, a National Semiconductor PC87307. The super I/O controller 280 may contain a variety of I/O adapters and other components such as the diskette adapter 282, serial adapter 284, a parallel adapter 286 and keyboard controller 288. The diskette adapter 282 provides the interface to the diskette drive 248. The serial adapter 284 has an external port connector, serial port 290, for attachment of external devices such as modems (not shown). The parallel adapter 286 has an external port connector, parallel port 292, for attachment of external devices such as printers (not shown). The keyboard controller 288 is the interface for the connectors, keyboard 236 and mouse 238.

Any of the components of computer system 112 may have an associated dust reflector in accordance with the present invention. Components that generate significant amounts of heat, such as the processor 210, system memory 222, video controller 216, etc., are particularly suited for having a dust reflector, as dust problems are exacerbated with components that generate or are susceptible to heat. Other components may also be suite for having an associated dust reflector, such as any component that may be damaged or have its performance impaired by dust.

FIG. 3 depicts a schematic isometric view of a fan, fan housing, and dust ionizer according to one embodiment. In the depicted embodiment, a fan housing 162 and dust ionizer 160 are located adjacent to each other, with the fan housing 162 located upstream of the dust ionizer 160. In an alternative embodiment, the dust ionizer 160 may be located upstream of the fan housing 162. In another alternative embodiment, the fan housing 162 and dust ionizer 160 may be located away from each other and may be connected by ducting, etc. In all of these embodiments, one or more fans 302 rotatably mounted within the fan housing 162 may be used to propel air through the fan housing 162 and the dust ionizer 160. An inner surface 308 of the fan housing 162 and/or dust ionizer 160 may be used to help contain and direct the flow of air through the fan housing 162 and/or dust ionizer 160. The flow of air, including any dust contained within, is schematically depicted with arrows in FIG. 3. In the depicted embodiment of FIG. 3, air is forced from region A1 to region A2 by fan 302. The air is then forced through the dust ionizer 160 from region A2 to region A3, after which it enters the enclosure of personal computer 112.

In the depicted embodiment, dust ionizer 160 includes a plurality of conductive plates 306 positioned with their substantially planar surfaces parallel to the airflow. Each plate 306 may be charged so that dust particles passing near them receive a charge. For example, a high negative voltage, low current charge on the plate 306 will impart a negative charge to many of the dust particles passing over the charged surface. Plates are particularly desirable for this application as it is relatively easy to control voltage over a plate. One of ordinary skill in the art will recognize, however, than any size, shape, number, or configuration of plates 306 or other objects may be used. For example, more or less plates 306 may be used, other shapes may be used (triangular, circular, rectangular, etc.), more complex flow patterns may be used (channels, flowpaths which redirect the airflow, etc.), other configurations (horizontal plates, honeycomb structure, etc.), etc. In an alternative embodiment, the inner surface 308 of the dust ionizer may be used to impart a charge to passing dust particles. In yet another alternative embodiment, the fan 302 may also be charged so that it imparts a charge to passing dust particles.

In this embodiment, as the air flows over both planar surfaces of each plate 306, a charge is imparted to many of the dust or other particles. Accordingly, air in region A3 will have significantly more charged dust particles than air in regions A1 and A2. Air in regions A1 and A2 may have a relatively small number of charged dust particles from the ambient air. All of the dust particles in region A3 are not likely to have a charge, as a dust ionizer that could ensure certain charging of each dust particle may be undesirably expensive or complex. The dust ionizer may be adapted to result in an increase in the amount of charged dust particles from region A2 to A3.

The dust ionizer 160 may be designed or configured in any fashion, shape, of any material, etc. as long as it allows some dust to pass through (including dust suspended in an airflow) and it may be adapted to carry a charge (i.e., made of a conductive material). Any level or type of charge may be utilized, including a high voltage, low current negative charge.

The dust ionizer 160 may receive power from the power supply 134, via a step up circuit or regulator, voltage switching supply, from the planar 132 (such as from voltage planes, an elevated voltage plane, etc.). In one embodiment, a planar 132 includes an elevated voltage plane that the dust ionizer 160 taps into and with which (along with a ground plane) a charge may be created. In another embodiment, the dust ionizer 160 may include its own voltage regulator. Any type of methodology to create a charge on the dust ionizer 160 or any component thereof may be used.

FIG. 4 depicts a schematic isometric view of a fan, fan housing, and dust ionizer according to an alternative embodiment. The embodiment of FIG. 4 is an alternative to that of FIG. 3, and similarly numbered components should be considered similar for all purposes. In the embodiment of FIG. 4, dust ionizer 160 contains a porous block 402 instead of a series of plates 306. The porous block 402 has a front side facing the airflow and a back side opposite the front side. The porous block 402 may be charged (such as with a negative high voltage, low current charge) and contain a plurality of holes 406 extending through the porous block 402 form the front side to the back side. Airflow may pass through the block holes 404 from regions A2 to region A3. In this embodiment, the interior surface of the holes 404 contains a charge (as does the entire porous block 402) and a charge is passed to dust particles as they pass through holes 404. Any number, size, configuration, pattern, orientation, etc. of holes 404 is possible. Any shape, size, material, orientation, etc. of block 402 is also possible.

Figure 5:
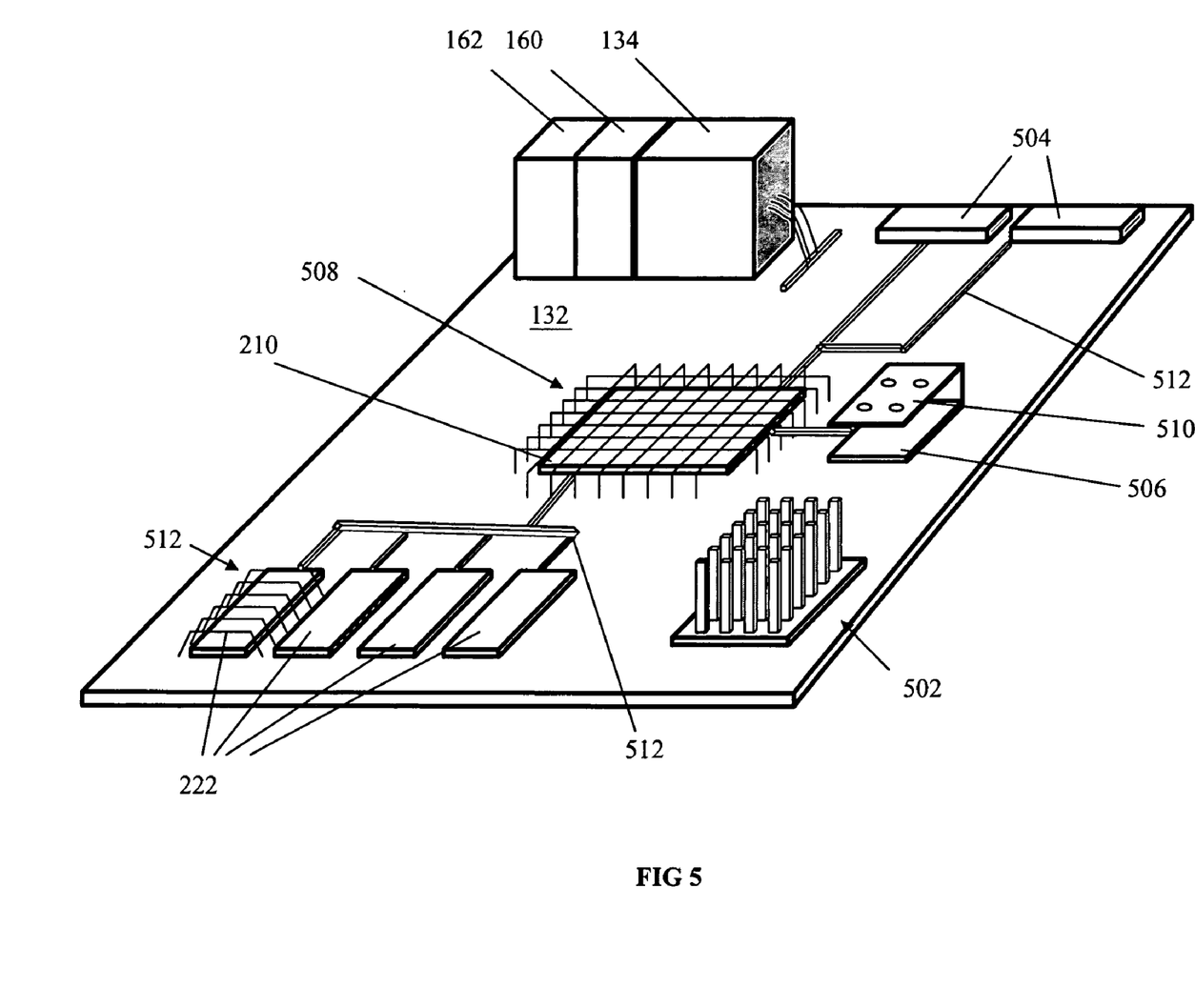
FIG. 5 depicts a schematic isometric view of a planar motherboard and components, including dust reflectors and a dust ionizer, according to one embodiment.

FIG. 5 depicts a schematic isometric view of a planar motherboard and components, including dust reflectors and a dust ionizer, according to one embodiment. In the depicted embodiment, a fan housing 162, dust ionizer 160, and power supply 134 are mounted to planar 132. Planar 132 also includes a number of mounted components, including a processor 210, system memory 222, a heat sink 502, input/output (I/O) devices 504, and a voltage regulator module (VRM) 506. Busses 512 may be used to interconnect various components of planar 132. Any type of component may be included on planar 132 and the depicted components are described only for exemplary purposes.

Heat sink 502 may be located near to, adjacent to, or coupled with any other component and may be associated with one or more components. A heat sink 502 adjacent to or coupled with a heat-producing component may serve to cool that component. Thermal energy is transferred from the component to the heat sink 502 and thereafter is transferred to the airflow via convection, thus resulting in cooling of the component. In one example, a heat sink 502 may be coupled (such as by being attached, via a heat pipe, etc.) with a processor 210 to provide cooling capability for the processor 210. Similarly, a heat sink 502 may be located near and thermally coupled with the memory modules of system memory 222.

VRM 506 may be an installable module that senses the processor's 210 voltage requirements and ensures that correct voltage is maintained. The operation of a VRM 506 may create a large amount of waste heat, resulting in dust accumulation being potentially an important issue.

A variety of types of dust reflectors are depicted in the embodiment of FIG. 5. Individual components or groups of components may be provided with dust reflectors. Each dust reflector may be provided with the same charge as that imparted to dust in the dust ionizer 160. When charged dust particles approach the dust reflector, such as when an airflow passes over, around, near, through or towards the dust reflector, the charged dust particles are deflected because of the similar charges. For example, if the dust particle has a negative charge and the dust reflector has a negative charge, they will repel each other. As the dust reflector, in some embodiments, has a much larger mass and is attached to planar 132, the charged dust particle will be pushed away from the dust reflector. This allows for dust particles to be kept away from components, reducing or eliminating accumulation of dust on the component, and helping to preserve the lifespan and performance of the component. Deflection of all dust particles, or even all charged dust particles, is not required, as even a reduction in the number of dust particles reaching a component may provide an advantage in improved lifespan, performance, and safety.

The dust reflectors may receive power from the power supply 134, via a step up circuit or regulator, voltage switching supply, from the planar 132 (such as from voltage planes, an elevated voltage plane, etc.). In one embodiment, a planar 132 includes an elevated voltage plane that the dust reflectors tap into and with which (along with a ground plane) a charge may be created. In another embodiment, each dust reflector may include its own voltage regulator. Tapping into an elevated voltage plane provides an advantage over voltage regulators for each dust reflector, as the cost, space and expense of multiple voltage regulators may be avoided.

In one example of a dust reflector, a mesh 508 is disposed over a component such as processor 210. In this embodiment, the mesh dust reflector 508 includes a mesh or screen that is charged and generally encloses processor 210. The mesh 508 of this embodiment is permeable to an airflow so that air may reach the processor 210 (or its associated heatsink 502) to provide cooling. A tighter weave of the mesh 508 provides additional deflection of charged dust particles, but may provide additional resistance to air flow and may reduce the amount of air reaching the processor 210. The mesh 508 need not provide a complete encapsulation of processor 210, it need only provide some deflection to dust particles moving with the airflow. For example, if the cooling airflow passed over a processor 210 from one side to another, a mesh 508 partially covering the processor 210 and favoring the upstream side of the processor 210 would be sufficient to provide satisfactory deflection of dust particles. A mesh 508 may be used as a dust reflector for any component, including components not on planar 132.

In another example of a dust reflector, a dust reflecting plate 510 is disposed over a component such as the VRM 506. In this embodiment, the dust reflecting plate 510 includes a variety of holes through which air may pass. As the dust reflecting plate 510 is charged, some dust particles in that airflow should be deflected. The configuration, placement, shape, number and size of holes, etc. of the dust reflecting plate 510 may be modified based on the component, airflow, location, etc. In one embodiment, a dust reflecting plate 510 may be placed facing the airflow, so that substantially all air reaching the component passes near the charged surface of the dust reflecting plate 510. A dust reflecting plate 510 may be used as a dust reflector for any component, including components not on planar 132.

In another example of a dust reflector, a group of dust reflecting wires 512 are disposed over a component such as one of the memory modules of the system memory 222. In this embodiment, the dust reflecting wires 512 allow air to pass through will deflect dust particles that come sufficiently close. Larger wires and/or closely-spaced wires provide additional amounts of deflection, but may limit cooling, cost more, and take up more space. The configuration, placement, shape, number and size of the dust reflecting wires 512 may be modified based on the component, airflow, location, etc. In one embodiment, the dust reflecting wires 512 may be placed over the system memory 222 or other component so that substantially all air reaching the component passes near the charged surface of one of the dust reflecting wires 512. Dust reflecting wires 512 may be used as a dust reflector for any component, including components not on planar 132. In an alternative embodiment, the dust reflecting wires 512 may be placed so that they cover all of the memory modules of the system memory 222, not just one.

In an alternative embodiment, a component may serve as its own dust reflector, obviating the need for a separate dust reflector. In this embodiment, the component, or some part of the component, should be able to carry a charge. In one example, a heat sink 502 may serve as its own dust reflector. In this example, the heat sink 502 may be made of a conductive material such as an aluminum-copper base alloy. As the heat sink 502 is charged in this embodiment, it will deflect charge dust particles, reducing or eliminating the amount of dust particles that come to rest on the heat sink. This embodiment may be particularly useful when a heat sink 502 is thermally and/or physically coupled with a processor 210, as a significant amount of heat is generated. In a further alternative embodiment, an adhesion-resistant film may be coated on the heat sink 508 or other component to provide further resistance to the accumulation of dust.

While dust reflectors such as meshes 508, dust reflecting plates 510, dust reflecting wires 512, or the component itself (e.g., heat sinks 502) are disclosed, one of ordinary skill in the art will recognize that other types of dust reflectors are possible, including different shapes or designs, combinations of different types of dust reflectors, etc.

Some components, such as the I/O devices 504 in the depicted embodiment, may not have any type of dust reflector. For some components, particularly components that do not generate substantial amounts of heat, dust accumulation may not be a serious problem. For other components, such as I/O devices 504, providing an electrical charge can have other undesirable consequences. A charged I/O device 504 may prove undesirable to users as it may cause a shock for users of the associated device. For other components, any additional expense or complication may not be worth the benefit achieved with a dust reflector.

Figure 6:
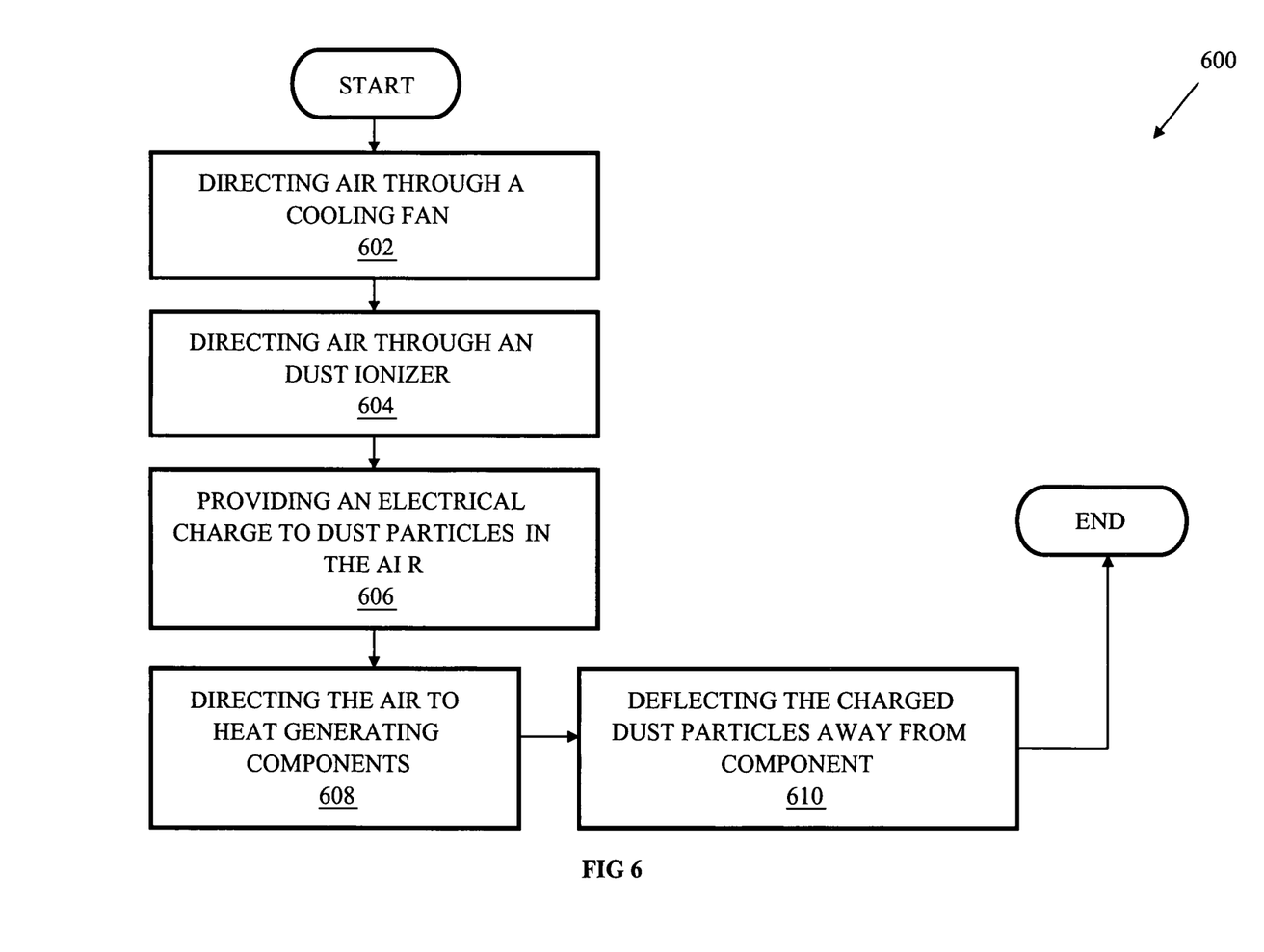
FIG. 6 depicts an example of a flow chart for reducing the dust on particular components of a computer system according to one embodiment.

FIG. 6 depicts an example of a flow chart for reducing the dust on particular components of a computer system according to one embodiment. Flow chart 600 begins with element 602, directing air through a cooling fan 302. In this element, air is drawn into the enclosure of computer system 112 through a fan 302. In element 604, the air is directed through a dust ionizer 160, where the dust particles are provided with an electrical charge in element 606. Elements 602 and 604 may be performed in any order.

Flow chart 600 continues to element 608, directing the air to heat generating components. In this element, air leaving the fan 302 or dust ionizer 160 may be directed towards any heat generating components. In one embodiment, a baffle may be used to direct the airflow towards particular components. In another embodiment, airflow may be generally directed over the planar 132 so that it passes over one or more heat generating components.

Flow chart 600 continues to element 610, deflecting the charged dust particles away from a component. This element may be performed by a dust reflector, such as those described in relation to FIG. 5. In this element, the dust reflector may be given a charge of the same polarity as that given to the dust particles by the dust ionizer 160 so that the dust particles and the dust reflector will repel each other. Deflecting the dust particles by utilizing their electrical charges provides an efficient method of reducing or eliminating dust build-up on the heat generating component. After element 610, flow chart 600 terminates.

It will be apparent to those skilled in the art having the benefit of this disclosure that the present invention contemplates a method and apparatus for reducing dust on components in a computer system. It is understood that the form of the invention shown and described in the detailed description and the drawings are to be taken merely as examples. It is intended that the following claims be interpreted broadly to embrace all the variations of the example embodiments disclosed.

What is claimed is:

1. A computer system comprising:
   an enclosure adapted to enclose components of the computer system;
   a component mounted within the enclosure, the component having at least one surface;
   a fan mounted within the enclosure, the fan being adapted to induce an airflow into the enclosure through an air intake and towards the component;
   a dust ionizer mounted within the enclosure, the dust ionizer being adapted to provide an electrical charge to dust particles within the airflow before the airflow reaches the component; and
   a dust reflector having an electrical charge mounted in proximity to the component, the dust reflector being adapted to deflect the charged dust particles away from the at least one surface of the component.

2. The system of claim 1, further comprising a planar board for electrically interconnecting components of the computer system.

3. The system of claim 1, wherein the component is a processor.

4. The system of claim 1, wherein the component is a heat sink.

5. The system of claim 1, wherein the component is a video chip.

6. The system of claim 1, wherein the component is a memory module.

7. The system of claim 1, wherein the component is a voltage regulator module.

8. The system of claim 1, wherein the dust ionizer is upstream of the fan.

9. The system of claim 1, wherein the dust ionizer is downstream of the fan.

10. The system of claim 1, wherein the dust ionizer comprises one or more negatively-charged conductive plates.

11. The system of claim 1, wherein the dust ionizer carries a high voltage, low current negative charge.

12. The system of claim 1, wherein the dust ionizer comprises one or more tubes.

13. The system of claim 1, wherein the dust ionizer has a front side facing the airflow and a back side opposite the front side, and wherein further the dust ionizer comprises a plurality of holes extending from the front side to the back side.

14. The system of claim 1, wherein the dust reflector carries a high voltage, low current negative charge.

15. The system of claim 1, wherein the dust reflector comprises a mesh.

16. The system of claim 1, wherein the dust reflector comprises one or more dust reflecting plates.

17. The system of claim 1, wherein the dust reflector comprises a plurality of dust reflecting wires.

18. The system of claim 1, wherein the dust reflector comprises a heat sink associated with the heat generating component.

19. The system of claim 1, wherein the component serves as the dust reflector, the component having an electrical charge and being adapted to deflect the charged dust particles away from the at least one surface of the component.

20. A method for reducing the accumulation of dust on a component of a computer system, the method comprising:
   directing air into an enclosure of the computer system, the air having dust particles within it;
   providing an electrical charge to dust particles in the air;
   directing the air towards a component to provide cooling to the component; and
   deflecting the charged dust particles away from the component.

21. The method of claim 20, wherein providing an electrical charge to dust particles in the air comprises directing air through a dust ionizer.

22. The method of claim 20, wherein providing an electrical charge to dust particles comprises providing a negative electrical charge to dust particles.

23. The method of claim 20, wherein directing the air towards a component comprises directing the air towards a heat generating component.

24. A computer system comprising:
an enclosure adapted to enclose components of the computer system;
a heat generating component mounted within the enclosure, the heat generating component having at least one surface;
airflow inducing means for inducing airflow towards the heat generating component;
dust charging means for providing an electrical charge to dust particles within the airflow before the airflow reaches the heat generating component; and
dust reflecting means for deflecting the charged dust particles away from the at least one surface of the heat generating component.

25. The system of claim 24, wherein the heat generating component and the dust reflector are coupled with the planar board.

26. The system of claim 24, further comprising a planar board for electrically interconnecting components of the computer system.

27. The system of claim 24, wherein the component is a processor.

28. The system of claim 24, wherein the component is a heat sink.

29. The system of claim 24, wherein the component is a memory module.

\* \* \* \* \*